United States Patent [19]
Lardieri

[11] Patent Number: 5,284,178
[45] Date of Patent: Feb. 8, 1994

[54] BUTTERFLY VALVE

[75] Inventor: Salvatore Lardieri, Altopascio, Italy

[73] Assignee: CO.I.RA. S.R.L., Altopascio, Italy

[21] Appl. No.: 5,145

[22] Filed: Jan. 15, 1993

[30] Foreign Application Priority Data

Jan. 16, 1992 [IT] Italy ................. FI/92/A/6

[51] Int. Cl.⁵ .................... F16K 1/22; F16K 35/00
[52] U.S. Cl. .................... 137/315; 251/95; 251/96; 251/102; 251/110; 251/306
[58] Field of Search .......... 137/315; 251/95, 98, 251/99, 102, 110, 113, 305, 306, 308, 96

[56] References Cited

U.S. PATENT DOCUMENTS

| | | | |
|---|---|---|---|
| 657,059 | 8/1900 | Broomell | 251/110 |
| 1,428,933 | 9/1922 | Bean, Jr. | 251/113 |
| 1,444,780 | 2/1923 | Davis | 251/113 |
| 3,084,715 | 4/1963 | Scharres | 251/308 |
| 3,540,691 | 11/1970 | Snell, Jr. | 251/306 |
| 4,014,511 | 3/1977 | Uno | 251/306 |
| 4,133,513 | 1/1979 | Meyer | 251/306 |
| 4,176,675 | 12/1979 | Liberman | 251/306 |
| 4,289,297 | 9/1981 | Nakanishi | 251/306 |
| 4,815,693 | 3/1989 | James et al. | 251/305 |
| 4,944,325 | 7/1990 | Baldwin et al. | 251/308 |

FOREIGN PATENT DOCUMENTS 0200868 3/1986 European Pat. Off. .
3220659 12/1983 Fed. Rep. of Germany .
7919468 2/1981 France .

Primary Examiner—George L. Walton
Attorney, Agent, or Firm—Browdy and Neimark

[57] ABSTRACT

An improved butterfly valve for intercepting a conduit where substances flow, especially suitable for the pharmaceutical, alimentary and chemical fields The valve comprises an annular body (1) integral with the conduit and acting as a support for the rotation stem (4) of the butterfly valve dish (3), which is operable at one end by an actuating lever (6) to open or close the internal port of the annular body (1) where a sealing member (2), tightly engaging with the butterfly valve dish (3) in the closed position, is housed. The body (1) comprises means for allowing an extremely quick and easy mounting and dismounting operations for cleaning purposes without affecting the sealing ability, operability and minimum flow resistance when the valve is fully open. The sealing member (2) is shaped to require a low effort while closing the valve as well as assuring the seal even in correspondence of the stem (4) of the butterfly valve dish (3). The latter comprises means for avoiding that pills trapped between it and the valve body (1) are broken. The actuating lever (6) allows the opening and the closing of the valve only after that a blocking system (33,35) has been actuated by the operator preventing that unskilled people would operate the valve.

11 Claims, 3 Drawing Sheets

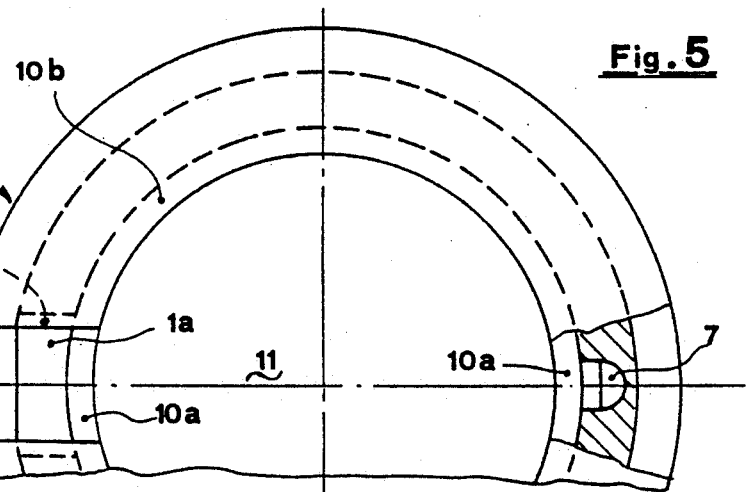
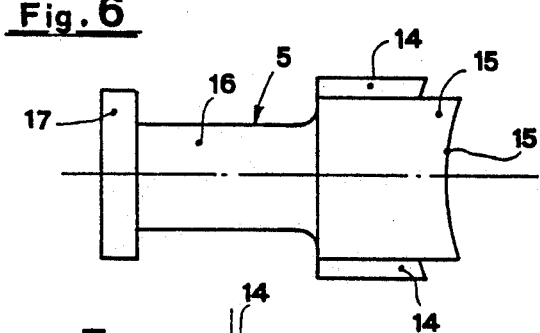
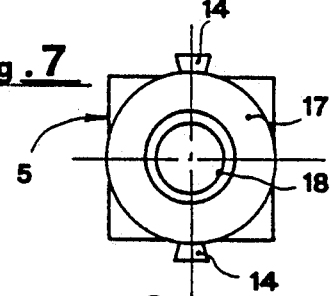
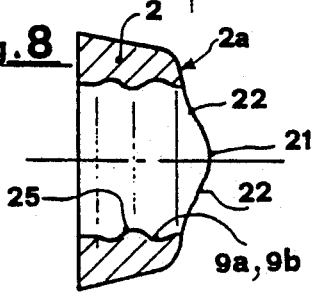
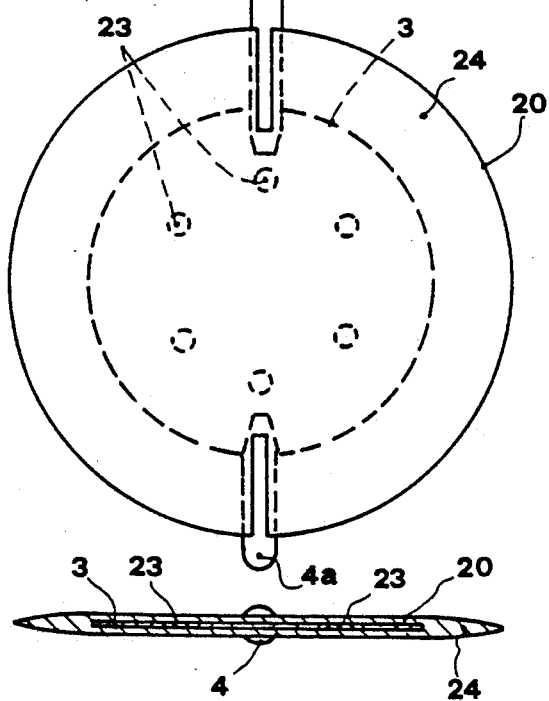

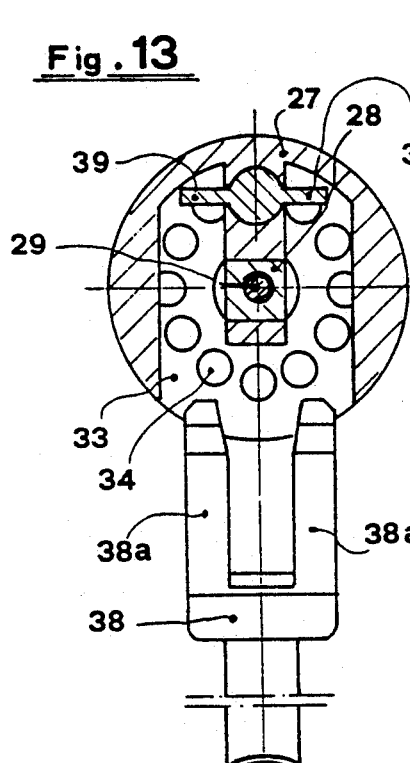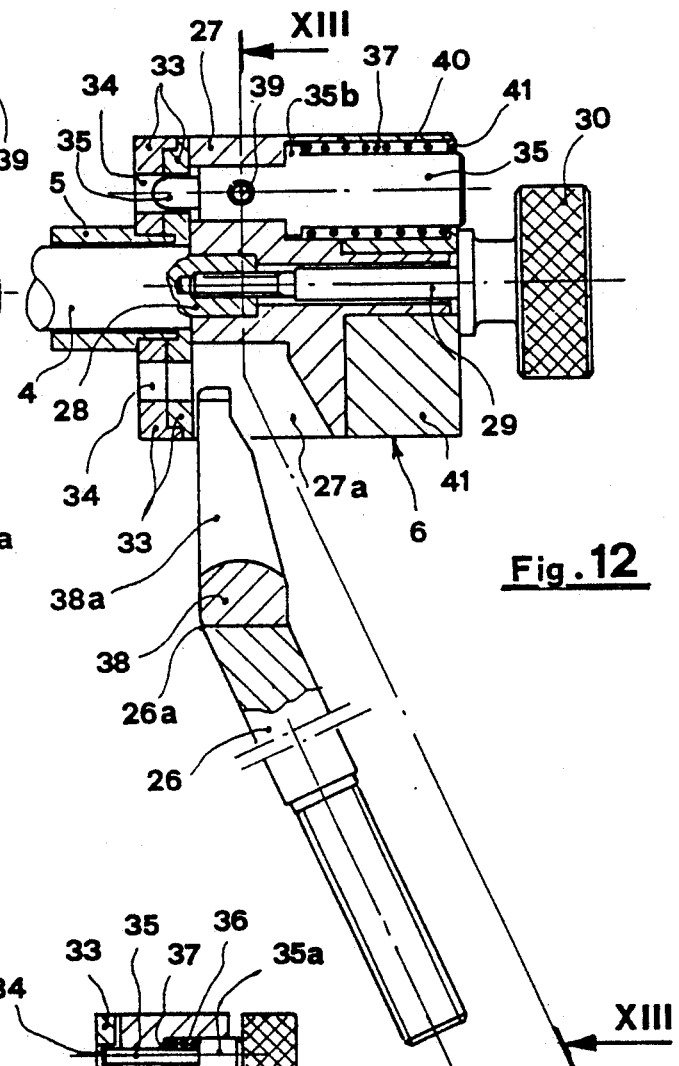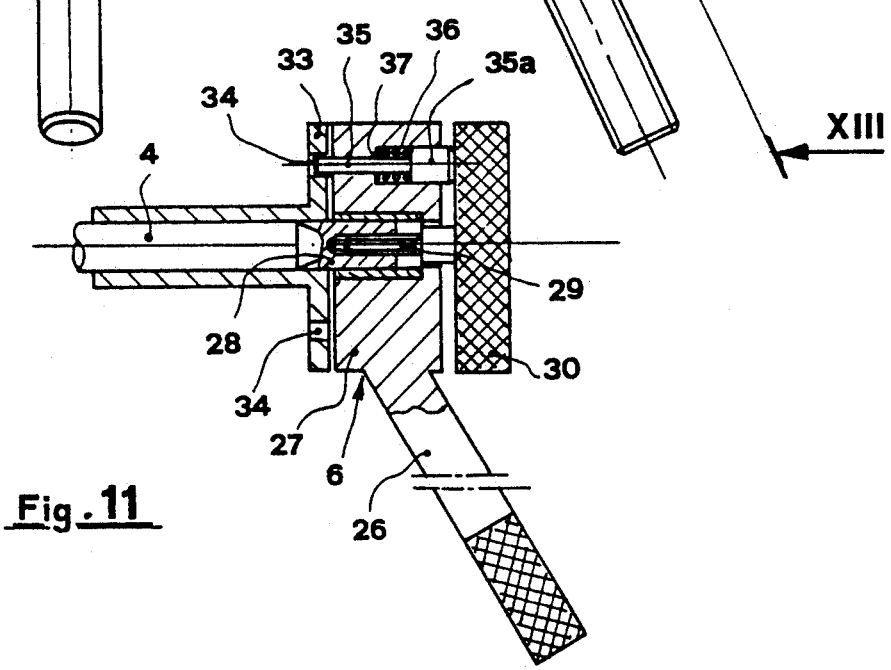

BUTTERFLY VALVE

FIELD OF THE INVENTION

The present invention generally relates to a flow control and on-off valve for plants handling loose or fluid substances, in particular of the chemical, pharmaceutical and alimentary fields and more precisely it relates to an improved butterfly valve.

DESCRIPTION OF THE PRIOR ART

The butterfly valves are well-known in the art. They consist of a disk, or butterfly, turnable on a diametral axis within a port of a valve body mounted in a pipe where a fluid flows. To allow a maximum seal to the valve the butterfly engages with the body in a close fit. Alternatively, in a butterfly valve produced by the Applicant, the butterfly engages in the body with a certain axial clearance and, after closing the valve, the butterfly self centers on an annular seal member housed in the body, forcing against the annular seal itself by a resilient reaction which assures sufficient seal to the valve.

In the plants where frequent production changes occur, such as those above mentioned, there is the need that all the relevant apparatuses and fittings be easily and quickly disassemblable for maintenance, cleaning and sterilization and successively assemblable in a short time. The above mentioned butterfly valve produced by the Applicant as well as that disclosed in German patent application No. 3220259, which are both suitable for this particular need, comprise a valve body made in two parts, connected by easily accessible and operable clamps or screws, and an annular seal member accomodated between said parts. By separating the two valve body parts the butterfly and the seal member can be removed and cleaned.

Actually, this type of valve, though satisfactory from the operating point of view, has proven of expensive construction together with other inconveniences. A first inconvenience is due to the rather high strength necessary to rotate the butterfly up to the closed position, strength which is due to the reaction caused by the rubbing of the edge of the butterfly against the annular seal, causing besides a rapid wear of the latter. Another incovenience consists in the not always perfect seal of the actuating stem of the butterfly in the holes radially made in the annular seal member, with a consequent reduction of the reliability of the valve in particular when dangerous or pollutant substances have to be intercepted. This problem is not present in the prior art butterfly valve disclosed in European patent application No. 200868 where the annular seal member is biassed with respect to the axis of the butterfly. Actually this valve appears more complex to construct and disassembly for cleaning purposes.

A further inconvenience of the prior art valves takes place when products like pills flowing through the valve can be broken by the butterfly while closing. The crumbled pills are cause of operating drawbacks complications and the more frequently the valve opens and closes the greater is the quantity of pills broken.

Finally the above mentioned valve produced by the Applicant has the inconvenience concerned with the fact that the butterfly cannot be safely blocked in different operating positions and, in particular, in a closed position. In fact, when the substances handled in such plants are noxious and/or polluting, a misoperation can cause serious damages. Another valve, disclosed in French patent application No. 2462630, comprises a lever provided with a projecting detent selectively engaging after unscrewing a blocking knob between teeth radially extending from a plate integral to the body of the valve. Nevertheless this blocking device is not easy to operate in particular when the lever of the valve must be frequently actioned.

The general object of the present invention is to obviate to the above mentioned drawbacks by providing a butterfly valve of improved design which is in particular:

quick and easy to assembly and disassebly;
simple and cheap to construct;
really safe to operate.

A first particular object of the present invention is to provide a butterfly valve for intercepting the flow of loose or fluid substances and particularly directed to the chemical, pharmaceutical and alimentary field, which allows an extremely quick and easy mounting and dismounting operation for cleaning purposes without affecting the sealing ability, operability and minimum flow resistance when the valve is fully open, as in the prior art valves.

A second particular object of the present invention is to provide a butterfly valve, wherein the butterfly engages with a sealing member requesting a low effort for closing the valve while assuring the seal even in correspondance of the butterfly stem.

A further object of the present invention is to provide a butterfly valve that, when handling substances in the form of pills or the like, would be able to avoid breaking of the pills trapped between the butterfly and the valve body.

Another particular object of the present invention is to provide a butterfly valve with an actuating lever for allowing the opening or the closure only after a blocking system has been actuated by the operator or even for preventing that unskilled people would operate the valve, thereby damages due to misoperation can be avoided.

SUMMARY OF THE INVENTION

The above and other objects are reached with the improved butterfly valve according to the present invention which is characterized in that said annular body comprises a movable block acting as a supporting seat for the actuating stem and a blind seat, diametrically opposite to the block, in which a rotation pivot of the disk aligned to the stem is engaged. The annular shaped seal which is housed in the annular body has a pair of radially geometrically opposite seal holes in which the stem and the pivot are respectively engaged. The dismounting for cleaning purposes and the assembling of butterfly from and to the annular body are allowed by extracting the block from the body as well as the stem and the pivot from the seats and the holes of the seal and viceversa. The block comprises prismatic guides slidingly engaging with corresponding slots radially formed in the annular body. There are provided means for reducing the strength necessary to close the valve, to improve the seal between the stem and the annular shaped seal and to prevent from crumbling loose material such as pills while closing the valve.

The butterfly can be swivelled by means of a lever comprising a bush at one end provided with at least a pin selectively engageable in a plurality of holes formed on a plate fixed to the block, a stopped knob being screwed in the operating end of the stem suitable for disengaging the pin from the plate in order to actuate the lever. According to a different embodiment the lever comprises a fork shaped end engageable with pegs extending from the pin which is spring loaded and slidingly housed in the bush.

BRIEF DESCRIPTION OF THE DRAWINGS

Other features and advantages of the butterfly valve according to the present invention will be more apparent from the following description made with reference to the attached drawings in which:

FIG. 5 is a partial top plan view of the valve body shown in FIGS. 1 to 4;

FIGS. 6 and 7 are respectively a top plan view and a front view of a block to be engaged in the valve body of FIG. 5;

FIG. 8 is a radial section of a seal of the valve according to the invention in correspondance with the hole for the disk stem;

FIGS. 9 and 10 are respectively a side view and a top plan view of a different embodiment of the disk of the valve according to the invention;

FIG. 11 is a sectional view of a first embodiment of the actuating lever of the valve of FIG. 1;

FIG. 12 is a sectional view of a second embodiment of the actuating lever of the valve of FIG. 1;

FIG. 13 is a sectional view according to arrows XIII—XIII of the lever shown in FIG. 12.

DESCRIPTION OF THE PREFERRED EMBODIMENT

Figure 1:
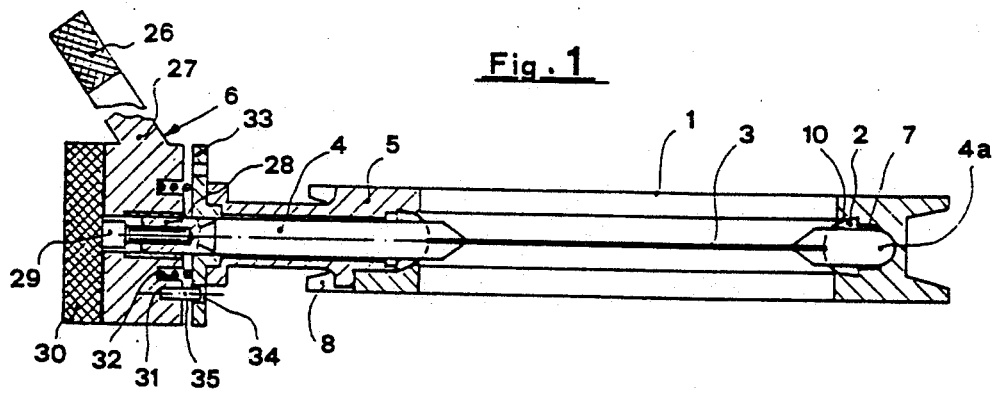
FIG. 1 is a diametral sectional view of a butterfly valve according to the invention.
Figure 4:
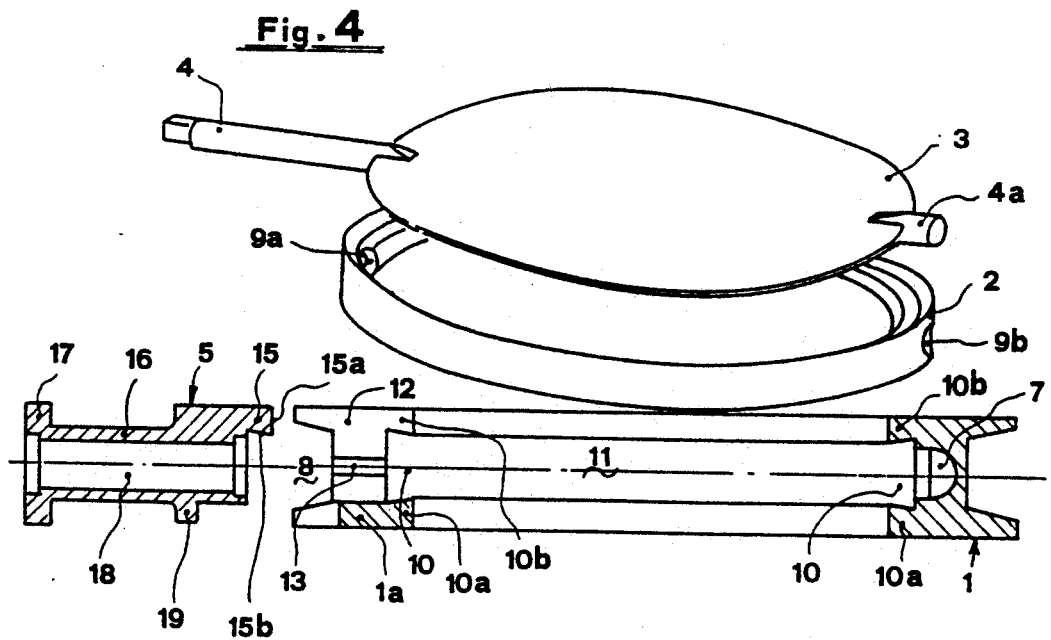
FIG. 4 is an exploded view of the valve according to the invention.

With reference to FIGS. 1, 4 and 5, a butterfly valve according to the present invention comprises an annular body 1 in which a seal 2 and a plugging disk element, or butterfly, 3 are housed. A stem 4 of the latter is supported by a block 5 slidingly engaged in the annular body 1 and whose rotation pivot 4a, diametrically aligned to stem 4, is rotatably engaged in a blind seat 7, made in the annular body 1 diametrically opposite to a radial recess 8 with which block 5 engages. The rotation of stem 4 can be operated by an actuating lever 6 keyed on it. More precisely seal 2 has a substantially trapezoidal cross section with a pair of radial diametrically opposite seal holes 9a and 9b with which stem 4 and the rotation pivot 4a of butterfly 3 are respectively engaged. Seal 2 engages with an annular housing 10 machined on the inner side of body 1. Said housing 10 has trapezoidal cross section defined by an upper and a lower edge, 10a and 10b respectively, projecting from body 1 inside its inner opening 11.

The recess 8, in which block 5 engages, is defined by two parallel side walls 12, as well as by the lower portion 1a of body 1 and by the edge 10a of housing 10. Besides, on side walls 12, the recess 8 is provided with two parallel opposite slots 13 in which two guides 14, laterally projecting from block 5, slidingly engage. The latter, as shown in FIGS. 4, 6 and 7, is provided with a lip 15 whose width is equal to recess 8 of annular body 1 and whose front edge 15a is shaped bent like edge 10b of body 1. Similarly the lower portion 15b, of lip 15 is tapered likewise edge 10b. Block 5, besides, comprises a neck 16 put between the projecting lip 15 and a circular flange 17, as well as a longitudinal hole 18 for receiving the stem 4 of butterfly 3 and a stop ledge 19 opposite to lip 15 with respect to the axis of hole 18.

The disassembly of the butterfly valve, starting from the condition shown in FIG. 1, can be made extracting block 5 from annular body 1, partially pulling out seal 2 from housing 10 and raising stem 4 so that butterfly 3 and seal 2 can be extracted together from body 1. Later on, seal 2 is separated first from pivot 4a and then from stem 4 of butterfly 3.

Assembly operations of the valve can be inversely carried out and more precisely: stem 4 is pushed into hole 9a of seal 2 and pivot 4a is pushed first into the opposite hole 9b and then in the blind seat 7 of body 1; seal 2 supporting butterfly 3 is inserted in housing 10 and block 5 simultaneously fits with stem 4 and in recess 8 of body 1 by means of side prismatic guides 14 engaging with slots 13. The stop ledge 19 of block 5 abuts against the lower portion 1a of body 1 in order that the concave edge 15a of lip 15 coincides with the circular edge 10b of housing 10.

Assembly and disassembly of the valve according to the invention are carried out in a very simple way in particular with respect to the two-portion body of the other type of butterfly valve. In addition, annular body 1 makes the valve more compact.

Figure 2:
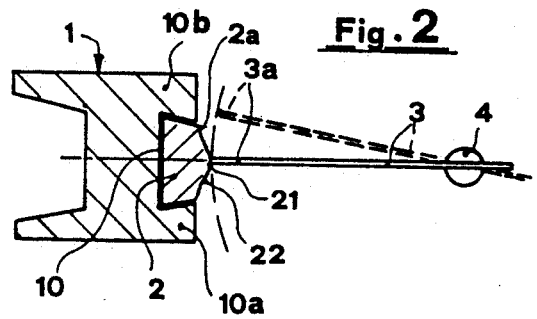
FIG. 2 is a partial diametral sectional view of a disk of the valve abutting against a seal accomodated in the valve body.

As shown in FIG. 2, to assure a satisfactory seal to the valve, a border 3a of butterfly 3 engages with the surface 2a of seal 2, which is provided with a central circumferential rib 21 with a round profile and parallel side slots 22. Border 3a of butterfly 3, which pivots about an axis formed by stem 4 and pivot 4a, engages with rib 21 and is forced against it by a resilient reaction which assures sufficient seal to the valve. Slots 22 are necessary to prevent border 3a from sliding against seal 2 before that butterfly 3 has completely gripped in order to limit rubbing which causes wear to seal 2 and require greater closing/opening power.

Figure 3:
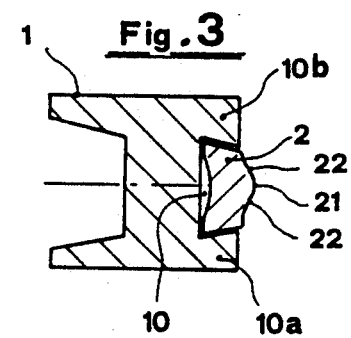
FIG. 3 is a partial diametral view of a different embodiment of the seal shown in FIG. 2 accomodated in the valve body.

With reference to FIG. 3, seal 2 can be forced inside housing 10 so as to give a convex shape to its cross section emphasizing the projection of rib 21 and increasing the resilient deflection that seal 2 can bear.

With reference to FIG. 8, holes 9a and 9b of seal 2 can have a corrugated longitudinal section, so as to assure a seal with the stem 4 or pivot 4a better than the seal of smooth and cylindrical inner surface holes. In particular, the cross section made at the central ridge 25 of seal 2 is of considerably minor width with respect to stem 4 or pivot 4a so as to assure the seal because of the deformation of ridge 25.

With reference to FIGS. 9 and 10, according to a different embodiment of the present invention, butterfly 3 is fully covered by a rubber like material layer 20, such as silicone resin, able to prevent that products like pills can be broken by the valve while closing. The rubber like material layer 20 is fixed to the surface of butterfly 3, by means of a multiplicity of through holes 23. The new border 24 of butterfly 3 is a ring 20 whose width is about 20% of the radius of the rigid portion of butterfly 3. Border 24 prevents pills from being broken even though they are interposed between seal 2 and butterfly 3 while closing the valve.

Butterfly 3, with reference to FIGS. 1, 2 and 4, may be of a very low thickness, even 50-70 times less than the valve diameter. This assures a perfect seal and permits flow of material even when the butterfly is rotated of small angles with respect to the closed position. Really the sliding of border 3a against seal 2 while opening, causes a vibration due to its small thickness able to make easier the sliding of material when the latter is a granulated or powdery one. In addition said small thickness of butterfly 3 minimizes the flow drag when the valve is fully opened.

With reference to FIG. 1, actuating lever 6 comprises an arm 26 having at one end a bush 27 in which the operating square end 28 of stem 4 is fixed and with which a screw 29 projecting from a knob 30 coaxial to bush 27 engages. The latter, at the opposite side with respect to knob 30, has an annular seat 31 in which a spring 32 thrusting against a circular plate 33 engages. The plate 33 is coaxial with stem 4 and is provided with a multiplicity of holes 34 circularly displaced. In one of the holes 34 a pin 35 projecting from bush 31 engages and can be disengaged after unscrewing knob 30 which causes bush 27 to move away plate 33 owing to spring 32.

The rotation of lever 6, and accordingly of butterfly 3, can be made by stem 4 only after that pin 35 has been completely extracted from hole 34 in which it was engaged. After this rotation it is possible to clamp the valve by screwing knob 30 and inserting pin 35 in the selected hole 34.

The opening of the valve according to the invention, can not yet inadvertently made by an operator, because said opening is possible only after unscrewing knob 30. In this way the safety of the valve is considerably increased and this is in particularly important when dangerous and/or polluting substances are handled.

With reference to FIG. 11, according to a first embodiment of the actuating lever 6, pin 35 is slidingly engaged with bush 27, instead of being fixed to it. Really, the sliding of pin 35 is opposed in one direction by a spring 36, housed in a seat 37 in which an enlarged portion 35a of pin 35 itself slides, and in the other direction by knob 30 engaging with the opposite side of the latter. After unscrewing knob 30 pin 35 frees holes 34 allowing that way the release of lever 6 without that any movement of bush 27 is needed with respect to plate 33. As a consequence of this arrangement, spring 36 is remarkably thinner than the spring 32 of the above described different embodiment of the actuating lever.

With reference to FIGS. 12 and 13, according to a further embodiment of the actuating lever 6, arm 26 is movably mounted to bush 27 by means of a fork-shaped end 38 bent at an angle of about 25-30 degrees in coincidence of a fulcrum 26a. Bush 27 has an inner recess 27a where two spaced prongs 38a of fork-shaped end 38 can be accomodated. Prongs 38a are spaced to allow their inserting in bush 27 in spite of the presence of end 28 of stem 4 in order that they can engage with two pegs 39 orthogonally extending from pin 35. The sliding of the latter is resiliently opposed in the upper direction owing to the position of a spring 40 put between an enlarged section 35b of said pin and a cap 41.

The opening of the valve is allowed after unscrewing knob 30 and inserting the fork-shaped end 38 of arm 26 into recess 27a in order that prongs 38a abut under pegs 39. The rotation of arm 26 about fulcrum 26a gets prongs 38a to raise pegs 39 pulling pin 35 out of hole 34 of plate 33. While pin 35 is kept raised with respect to plate 33, arm 26 can be rotated so as to open or to close butterfly 3 as well as to stop it in an intermediate angular position. A successive extraction of fork-shaped end 38 from bush 27 causes the release of pin 35 in an other selected hole 34 preventing from any further closing or opening operation of the valve because arm 26 can be removed and stored in a safe place to be used only by authorized operators.

The improved butterfly valve according to the invention has many novel features which allow a better use of it and in particular, as above described, make easier disassembly and assembly necessary for its cleaning, still assuring a high seal. In addition these features make possible a safe blocking of the butterfly in different intermediate work positions.

The valve is specifically studied for powdery and granulated substances, but it can be used also for the interception of liquids or other fluids. Another particular use of the valve is to intercept dangerous or pollutant substances, by virtue of the perfect seal of the butterfly.

I claim:

1. Improved butterfly valve for intercepting a conduit where substances flow, especially suitable for the pharmaceutical, alimentary and chemical fields, comprising:

an annular body (1) integral with said conduit, a butterfly valve dish (3) having a rotation stem (4), said rotation stem (4) rotatably engaged on said annular body, said butterfly valve dish operable at one end by an actuating lever (6) to open and close an internal port of said annular body (1), a seal (2) housed in said annular body and tightly engaging with said butterfly valve dish (3) in a closed position, said annular body (1) including a removable bock (5) which forms a small section on one flat side of said annular body at a top surface thing, said removable block having a supporting seat (18) for said stem (4), said annular body further including a blind seat (7), diametrically opposite to said block (5) in which a rotation pivot (4a) of said butterfly valve dish (3) aligned to said stem (4) is engaged, said seal (2) having an annular shape and a pair of radially diametrically opposite seal holes (9a, 9b), in which said stem (4) and said rotation pivot (4a) are respectively received and engaged therein, wherein said dismounting for cleaning and the assembling of said butterfly valve dish (3) from and to said annular body (1) are allowed by extracting said small removable block (5) from said body and partially pulling out said seal from said housing and raising said stem for sliding said stem (4) and pivot (4a) respectively from said supporting seat and said blind seal (7, 18) and said seal holes (9a, 9b) of said seal (2) and vice versa while at the same time extracting and inserting said seal together as a single unit without dismantling a remaining portion of said annular body, and said actuating lever (6) comprising means (27,33,35) for locking said butterfly (3) in a plurality of operating positions.

2. Improved butterfly valve according to claim 1, wherein said removable block (5) comprises: prismatic guides (14) slidingly engaging with corresponding slots (13) formed radially in said annular body (1); a projecting lip (15) with a concave edge (15a) having the same curvature as that of the internal circular edge (10b) of said annular body (1); a stop ledge (19) abutting against (1a) said annular body (1) when said lip (15) has its concave edge (15a) in coincidence with the edge (10b) of said annular body (1).

3. Improved butterfly valve according to claim 1, wherein the surface (2a) of said seal (2) contacting the edge (3a) of said butterfly valve dish (3) has a circumferentially extending central rib (21) between two parallel slots (22), whereby said rib elastically forces with said butterfly (3) with minimum forcing energy and excellent sealing.

4. Improved butterfly valve according to claim 1, wherein said radial holes (9a, 9b) of said seal (2) in which said stem (4) and said pivot (4a) are housed, have circumferential sealing ribs (25).

5. Improved butterfly valve according to claim 1, wherein said butterfly (3) valve dish has a thickness 50-70 times less than the diameter of the port of said annular body (1).

6. Improved butterfly valve according to claim 1, wherein said butterfly (3) valve dish is covered with a layer (20) of rubber material annularly extending (24) beyond the peripheral edge (3a) of said butterfly valve dish (3) and anchored to it through holes (23) formed on the butterfly valve dish (3) itself.

7. Improved butterfly valve according to claim 6, wherein said rubber material is silicone rubber.

8. Improved butterfly valve according to claim 1, wherein said blocking means of said actuating lever (6) comprises a bush (27), in which the operating end (28) of said stem (4) is fixed, connected to the end of an arm (26) of said lever (6) and provided with at least a pine (35) selectively engageable in a plurality of holes (34) formed on a plate (33) fixed to said block (5), a stop knob (30) being screwed down in said operating end (28) of said stem (4) on top of said pin (35) to selectively lock said lever in different operating positions and screwed out of engagement with said pin to release a locked position.

9. Improved butterfly valve according to claim 8, wherein said pin (35) is fixed to said bush (27) and spring means (32) housed in an annular seat (31) formed on said bush (27) is placed between said plate (33) and said bush (27).

10. Improved butterfly valve according to claim 8, wherein said pin (35) is slidably engaged in said bush (27) and is opposed by said stop knob (30) in one direction and by spring means (36), housed in a seat (37) of said bush (27) where a head (35a) of said pin (35) slides, in the other direction.

11. Improved butterfly valve according to claim 8, wherein said arm (26) is removable from said bush (27) and has a substantially fork-shaped end (38) engageable in an internal seat (27a) of said bush (27), said end (38) forming an angle with said arm (26) in correspondence with a fulcrum (26a) and having a pair of prongs (38a) which, when said end (38) is fully engaged with said seat (27a), abut against pegs (39) orthogonally extending from said pin (35) which is slidably mounted in said bush (27) and elastically urged by a spring (40), whereby, following a rotation of said fork-shaped end (38) about said fulcrum (26a), said pegs (39) are moved away from said plate (33), said pin (35) extracted from said holes (34) and said butterfly (3) released and made maneuverable through said arm (26).

* * * * *